United States Patent [19]

Heath, Jr. et al.

[11] 3,778,210

[45] Dec. 11, 1973

[54] INJECTION BLOW MOLDING MACHINE

[75] Inventors: Harry Garett Heath, Jr., Milmay; Carl Holzapfel, Ocean City, both of N.J.

[73] Assignee: Wheaton Industries, Millville, N.J.

[22] Filed: Jan. 5, 1972

[21] Appl. No.: 215,524

[52] U.S. Cl.............. 425/242, 425/342, 425/326, 425/DIG. 203, 425/DIG. 209, 425/DIG. 213
[51] Int. Cl............................ B29c 1/00, B29f 1/00
[58] Field of Search.................. 264/97; 425/242 B, 425/326 B, 326 BJ, 342, 387 B, DIG. 203, DIG. 209, DIG. 211, DIG. 213, 242, 326, 324 B, DIG. 206

[56] References Cited
UNITED STATES PATENTS

| | | | |
|---|---|---|---|
| 2,750,625 | 6/1956 | Colombo | 425/327 B |
| 3,507,005 | 4/1970 | Wiley et al. | 425/387 B |
| 3,555,598 | 1/1971 | Mehnert | 425/324 B |
| 3,707,591 | 12/1972 | Chalfont | 425/242 B |

Primary Examiner—Richard B. Lazarus
Attorney—Henry N. Paul, Jr. et al.

[57] ABSTRACT

An injection blow mold machine having a rotary wheel indexing means adapted to be indexed and precisely positioned in a simple manner and further adapted to be used in conjunction with simplified injection pressure resistance means and simplified air inlet means, all of the injection blow molding apparatus being adapted to be utilized in a modified conventional injection molding machine. The rotary wheel indexing means comprises a central portion with radial arms extending therefrom and core rods mounted perpendicularly on said radial arms. Compressive force limiting means interposed between the blow mold and the movable platen on which the movable injection and blow mold halves are mounted distributes a disproportionately greater stress to the injection mold than to said blow mold. Still other unique features of the machine include a 360°–180° limit switch and precise and simple means for positioning molds in the apparatus mold receiving members.

15 Claims, 14 Drawing Figures

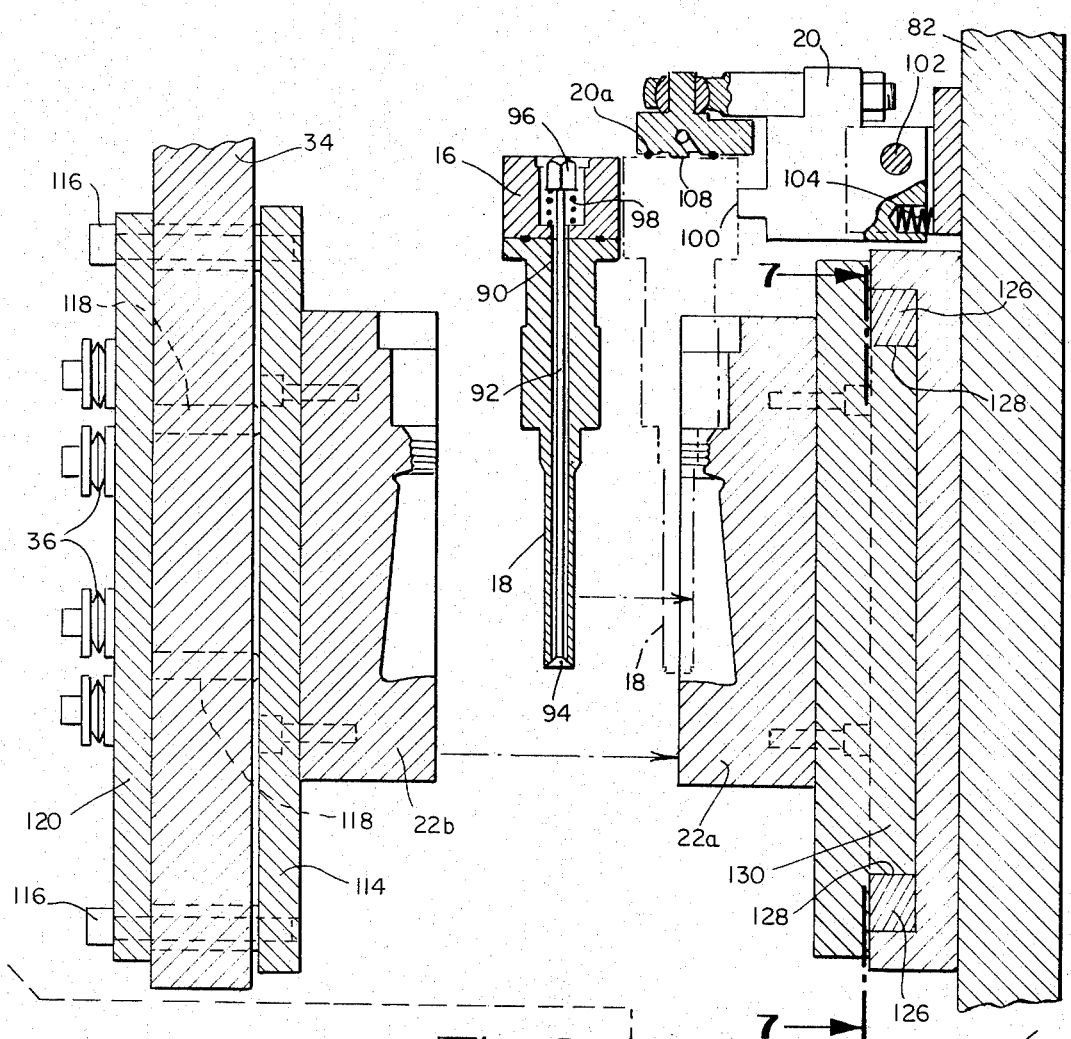
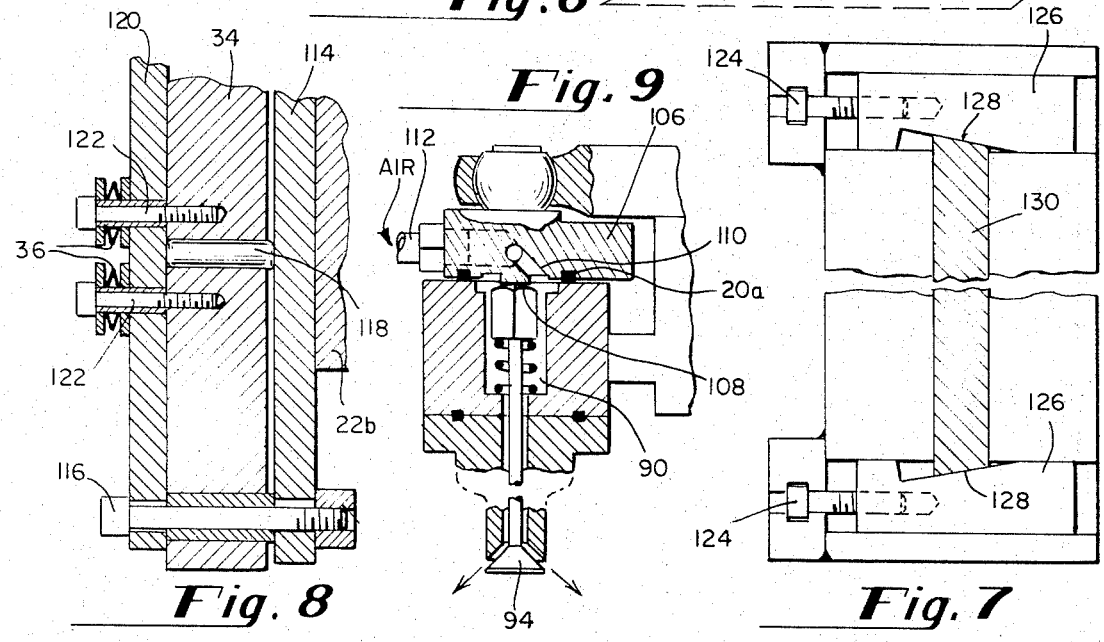
Fig. 6
Fig. 8
Fig. 9
Fig. 7

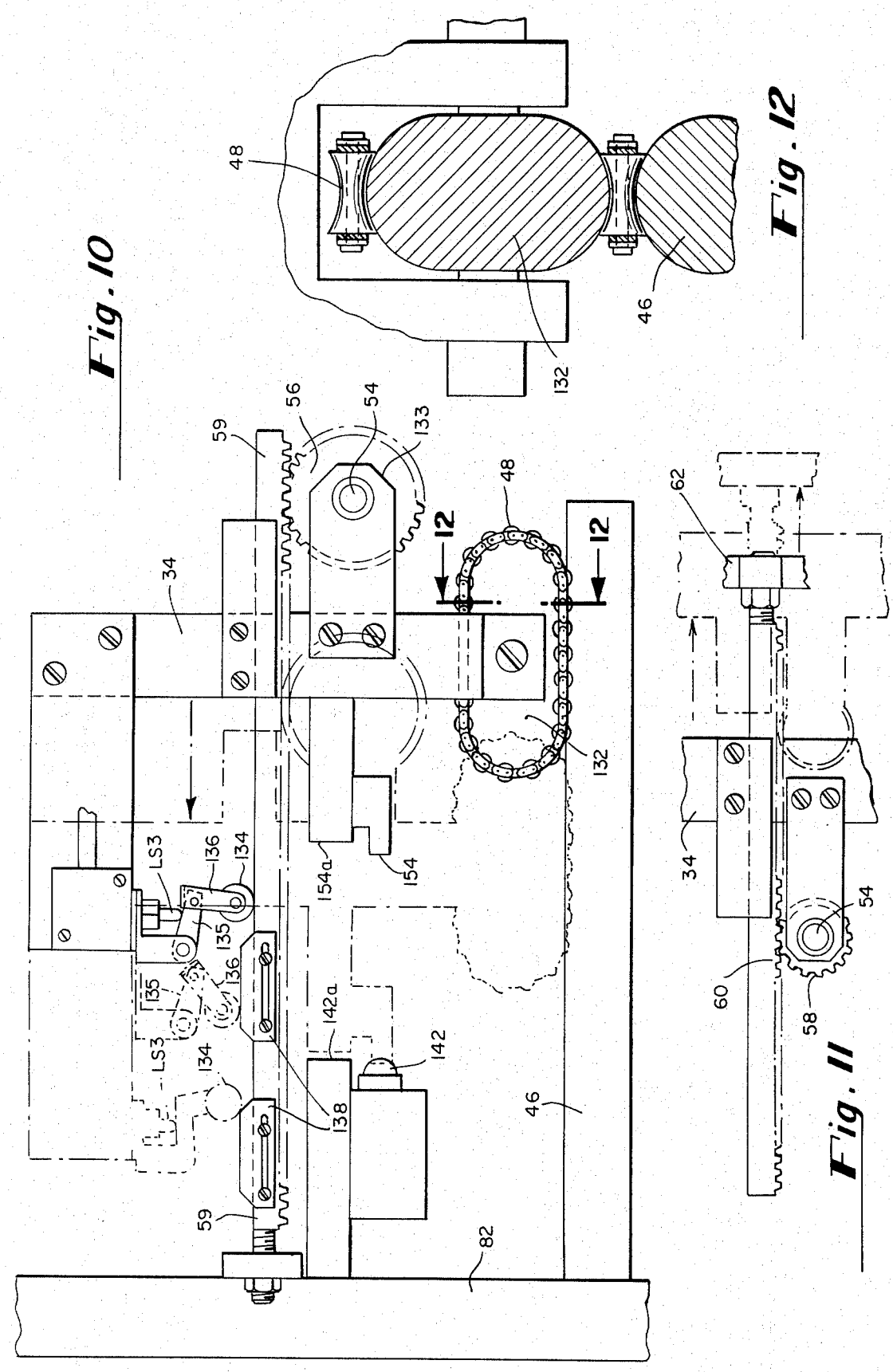

INJECTION BLOW MOLDING MACHINE

This invention pertains to an improved injection blow molding machine and particularly to a simplified light weight machine having several unique structural and operating features all of which are particularly adapted to function with one another in a simple and reliable manner.

Injection blow molding machines for making plastic bottles are well known. Their evolution dates back to the 1940's when apparatus concepts based on glass bottle making were adapted to the making of plastic containers. Around 1950, Alfred Borer, among others, began developing injection blow molding machines based on plastic injection molding apparatus with an additional mold set, the blow mold, and transfer mechanisms for transferring the injection molded parison to the blow mold between the stationary and movable platens of injection blow molding machines. U. S. Pat. No. 2,789,312 — Borer, depicts this stage of the development. Various difficulties were encountered in these early machines, including the difficulty of uneven stress distribution between the blow mold and the injection mold. This uneven loading is due to the necessary asymmetric positioning of the injection and blow molds on the common stationary and movable platens and to the necessary differential in internal pressure in the molds resulting from the plastic injection occurring at a substantially higher pressure than the compressed air injection necessary to blow the bottle in the blow mold.

Gradually, these problems were overcome either by structural designs to apply press force as necessary to the injection mold disregarding the over pressure on the blow mold or by separating the platens and mounting the injection and blow molds on separate platens upon each of which pressure was applied as necessary. Concurrently, optimization of cycle time and quick and reliable transfer means lead to the development of machines wherein the mandrels or core rods about which the parisons were injection molded were mounted radially upon a rotating indexing head. Such heads necessarily were expensive and complicated since each such head had several functions. Air passageways and air valve actuators for the core rods mounted on the head were included in the head. Moreover, because the head had to resist the injection pressure as plastic was forced around the core rod and against the head, the head was necessarily heavy and designed to withstand considerable stress perpendicularly to the shaft thereof. Still another disadvantage of the head in this type of apparatus was that the very precise positioning necessary for the core rod to mate with the neck portions of the respective blow mold and injection molds required complicated indexing means which contributed to maintenance problems.

While numerous other machine concepts have been proposed to overcome the various difficulties in injection blow molding some of which are described above, and to simplify the apparatus used in such methods, all such machine concepts have been found to embody inherent design problems which impaired the reliability and/or operability of such machines.

As a result, there remains a need for a simplified injection blow molding machine wherein a light weight core rod holder and indexing means is provided, the indexing and positioning of which is effected in a simple manner and the design of which is adapted to facilitate the other necessary functions in an injection blow molding machine with a minimum of complexity both in the indexing means and in the associated parts of the machine.

It is an object of the present invention to provide such a machine and further to provide a simplified and reliable injection blow molding machine which is also light weight, inexpensive, easy to maintain and safe both with respect to possible operator injuries and machine damage due to malfunctions.

A further object of the present invention is to provide such a machine by the inclusion of numerous subcombinations particularly adapted to function in such machines, each having possible application in other types of injection blow molding equipment.

Still another object of this invention is to provide various injection blow molding apparatus components which simplify set-up, operation and maintenance of such machines and to provide a single machine incorporating all of these features further including numerous other features to facilitate operation and maintenance thereof.

These and other objects, are met, in accordance with the present invention, by an injection blow molding machine incorporating one or more of the following novel and unique features.

1. Rotary wheel core rod holder and transfer member or indexing means, also referred to sometimes herein as a "rotor," consisting of a center wheel or hub portion and, projecting therefrom, radial arms portions. Such radial arms are evenly distributed about the central hub portion, extending either along a radius of the wheel member or parallel to such a radius. In the preferred form of the present invention, three such radial arm portions are positioned tangent to the central hub portion. The number of radial arm portions corresponds to the number of machine work stations. In the preferred form of the present invention, three such work stations are provided and accordingly three such radial arm portions are included in the rotary wheel transfer member. Each of the radial arms are adapted to have mounted thereon one or more core rods projecting perpendicularly thereto. In the preferred form of the present invention, each of the radial arms includes a hole mating with the interior of the core rod mounted thereon, providing an opening for the core rod valve actuator to project therethrough, thereby permitting engagement of the core rod valve actuator member of the core rod by a valve actuating means associated with a mating compressed gas inlet means through which compressed gas is introduced into the core rod at one or more work stations.

2. Rotary indexing means positioning means comprising a transfer means for indexing the rotor approximately to the position necessary for the next cycle of the apparatus and thereafter declutching the indexing means permitting free radial movement thereof. Guide means are then provided so that upon seating of the rotary wheel indexing means into the mold closed position of the apparatus the indexing means is precisely positioned to ensure accurate placement of the core rods in the molds. The guide means may also serve as stress bearing members resisting injection pressure acting toward the mounting face of a core rod holding member.

3. Incorporation of the injection blow molding apparatus of the present apparatus in a conventional injection molding machine is facilitated by providing means for uneven or asymmetric stress distribution on the movable platen of such a machine by the mounting thereon of the movable blow mold half with stress relieving means such as "Schnorr" springs or compression washers permitting slight movement of the movable platen in the area of the blow mold thereby to distribute greater stress as required to the injection mold area.

4. Core rod valve actuating member and mating compressed gas passageway means provided in a compressed gas inlet mechanism pivoted into engagement with the core rod or a passageway leading into the core rod by rotating slightly about a pivot point, the pivotal movement being produced by the seating of the core rod transfer member.

5. A unique 360°–180° limit switch, provided to ensure safe operation of the apparatus, comprises a ball sensing member spring loaded outward. Grooves are provided to receive the ball member when the indexing members are in a proper index position. Otherwise, contact is made with the ball indicating that the apparatus is malfunctioning.

For a better description of these and other features of the present invention, reference is made to the following detailed description of the preferred embodiment of the present invention, taken in conjunction with the appended claims and drawings, wherein:

FIG. 6 is an enlarged sectional view depicting the blow mold set-up thereof;

FIGS. 7, 8 and 9 are enlarged detailed views showing structural features incorporated in the mold positioning mechanism, the stress distribution, and the air inlet mechanism, respectively, of the machine;

FIG. 10 is a side view of the same machine, from the left side, showing particular switching members and weight carrying members;

FIG. 11 is a partial side view, from the right side, showing other features of the invention;

FIG. 12 is a detailed view of the weight carrying members supporting the movable platen in the machine illustrated in the preceding FIGURES;

Figure 1:
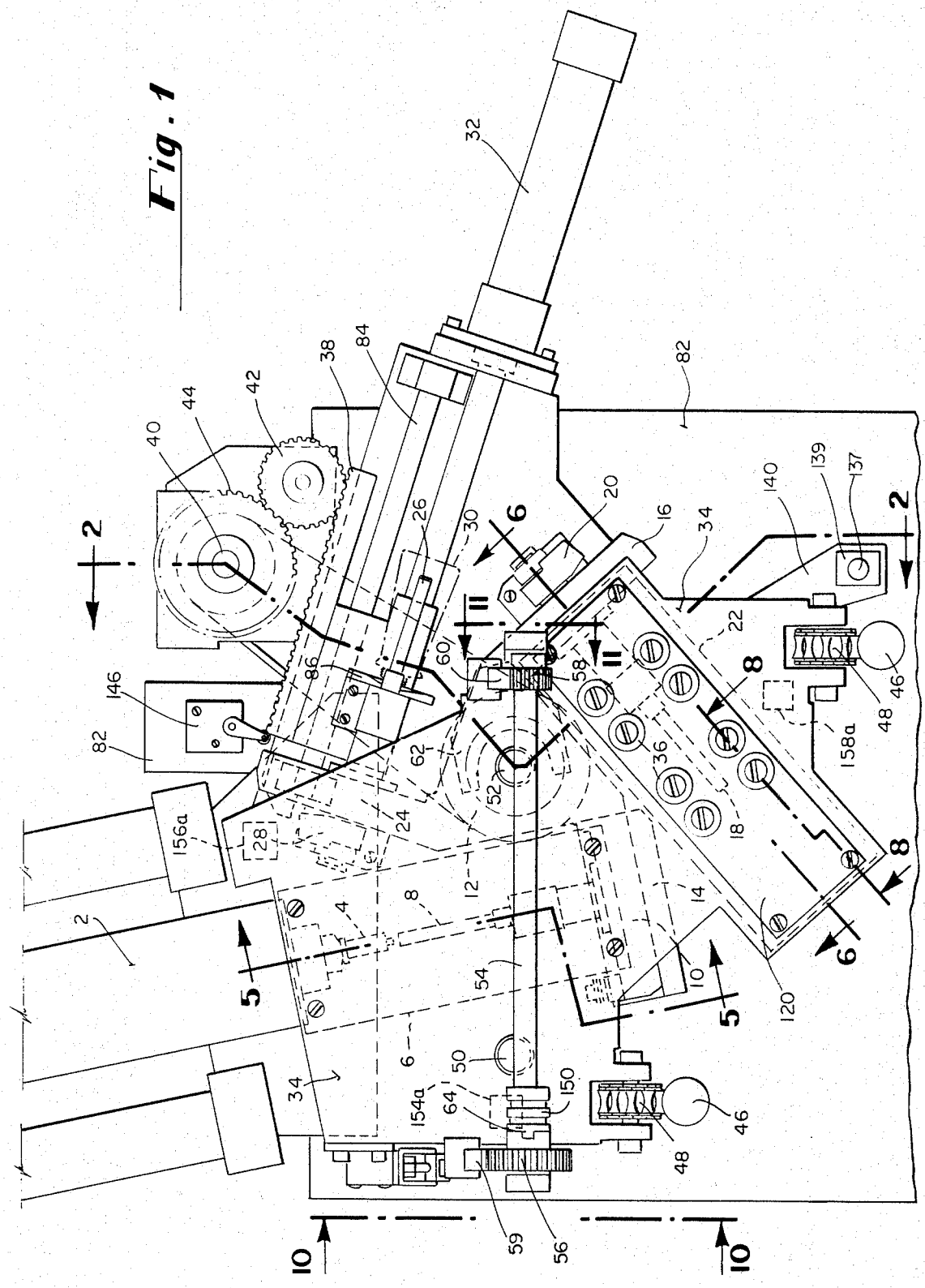
FIG. 1 is a front elevation view of the preferred embodiment of the improved injection blow molding machine of the present invention.

Referring more specifically now to FIG. 1, FIG. 1 is a front elevation view, partially in section, of the improved injection blow molding machine of the present invention. More specifically there is seen in FIG. 1, plastic melt extruder 2 terminating in nozzle 4 feeding a parison injection mold cavity in mold 6 enclosing core rod 8 mounted on radial arm 10 of rotary wheel indexing means 12, also sometimes referred to herein as a rotor. Backing member 14 abuts radial arm 10 to resist thrust upon radial arm 10 caused by the application of injection pressure in the cavity of injection mold 6. A second radial arm 16 having a second core rod 18 attached thereto abuts blow air inlet means 20 with a second core rod 18 disposed in the cavity of blow mold 22.

A third radial arm 24 with a third core rod 26 mounted thereon abuts a temperature conditioning air inlet means 28 with a third core rod 26 attached thereto in a position for a bottle 30 blown thereon to be stripped therefrom by a stripper mechanism 32, shown in more detail hereinafter.

Both injection mold 6 and blow mold 22 consist of a pair of mold halves, respective halves of each of which are mounted on movable platen 34. The movable blow mold half is secured to movable platen 34 by stress relief means such as so called "Schnorr" springs 36, described in more detail hereinafter, to limit the compressive force applied to blow mold 22 by movable platen 34 and to cause a disproportionately greater force on the injection mold 6 than on blow mold 22.

Associated with stripper mechanism 32 is rack 38 turning a shaft 40 through gears 42 and 44.

Movable platen 34 rests on support members 46 by means of rolling load carrying sprocket chain supporting rollers 48. Movable platen 34 also moves in its reciprocating opening and closing movement on tie bars 50 and 52, the latter of which further serves as the central supporting shaft of rotor 12, providing the axis therefor about which are radially distributed in a common plane with rotor 12 the three work stations at which the primary functions of the machine are carried out, namely the injection station, the blow station and the bottle stripper station.

On the front of movable platen 34 is mounted a reducing shaft 54 having a first gear 56 on one end thereof engaging a fixed rack 59. On the other end of reducing shaft 54 is a second gear 58, one half the diameter of the first gear 56. Second gear 58 in turn engages a second rack 60 attached to a yoke member 62 engaging rotary wheel indexing means 12 to cause simultaneous reciprocating movement of rotary wheel indexing means 12 with movable platen 34 through half the distance of the movement of movable platen 34. Key and key way 64 are provided in the engagement of first gear 56 by reducing shaft 54 in order to ensure proper relative positioning of movable platen 34 and rotary wheel indexing means 12. Sleeve 150 slidably mounted on shaft 50 permits disengagement of gear 56 from shaft 50 so that yoke member 62 and rotary wheel indexing means 12 may be moved manually toward and/or away from movable platen 34 and stationary platen 82 independent of any movement of movable platen 34. Such manual movement facilitates mold and core rod set-up as well as inspection for proper machine functioning, etc.

Figure 2:
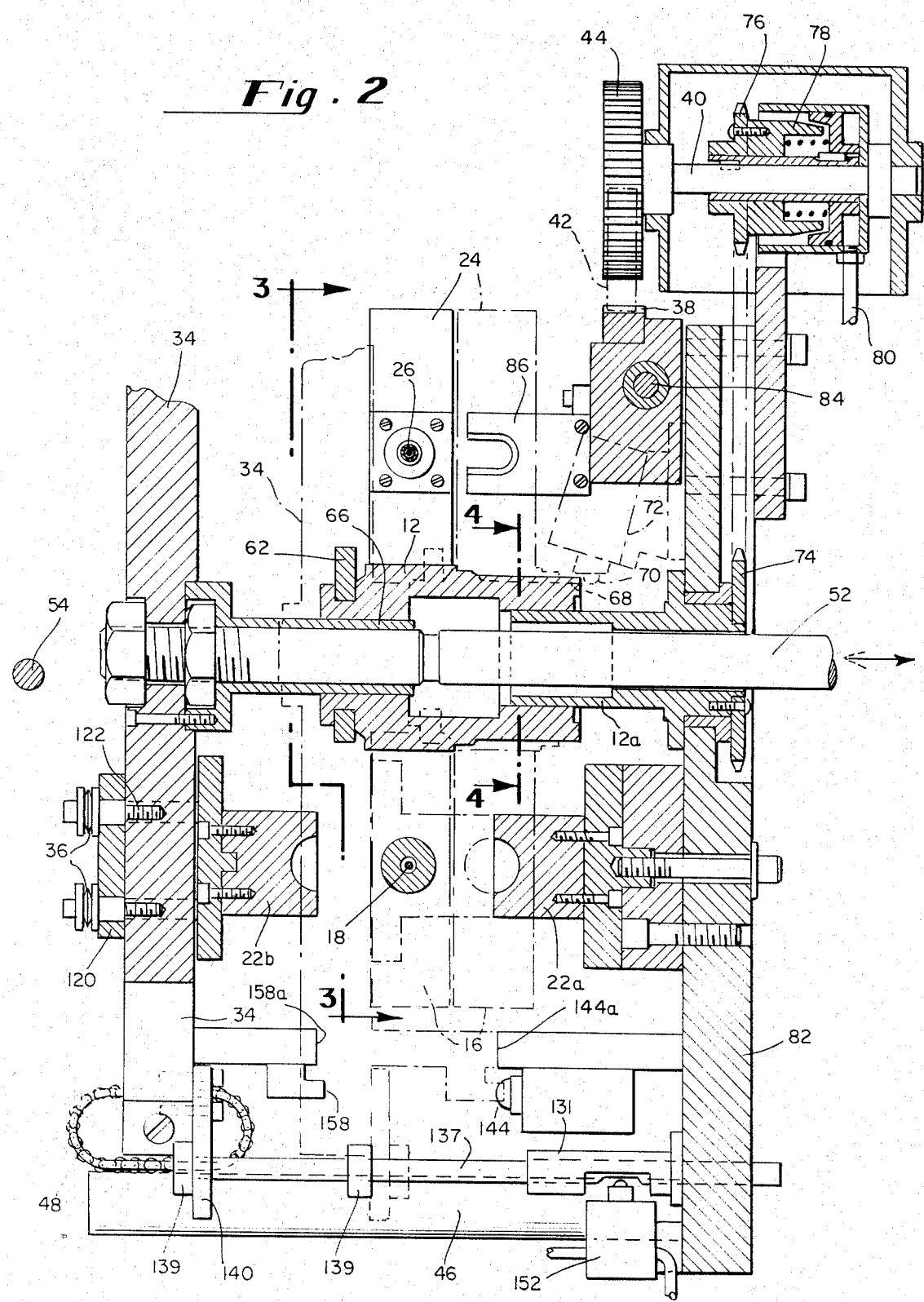
FIG. 2 is a side sectional elevation view in the plane 2—2 of the apparatus shown in FIG. 1.

In FIG. 2, which is a side sectional view in the plane 2—2 of the apparatus shown in FIG. 1, the apparatus of FIG. 1 is shown in the open position, with certain mold elements and rotary wheel indexing means 12 also shown, in phantom lines, in the closed position. More specifically there is seen in FIG. 1 rotary wheel indexing means 12 mounted on shaft 66 surrounding tie bar 52. Yoke member 62 is also shown. Grooves 68 on the periphery of shaft 66 in positions corresponding to the positions of the three radial arms 10 of rotary wheel indexing means 12 engage the ball protruding mechanism 70 of a 360°–180° sensor 72, shown in phantom, (sometimes referred to as "LS6"), which ensures proper radial positioning of rotary wheel indexing means 12 as the latter attempts to seat in its mold closed position prior to further sequencing of the apparatus. The 360°–180° sensor 72 is in itself a novel and unique feature of the present invention, which will be described more fully hereinafter.

Shaft 66 is connected to sprocket wheel 74 engaging a sprocket chain, not shown connecting sprocket wheel 74 with sprocket wheel 76 mounted on an indexing means disengaging clutch 78 permitting, upon admission of pressurized fluid, such as compressed air, from inlet 80, engagement of shaft 40, thereby to permit indexing of rotary wheel indexing means 12 through indexing means disengaging clutch 78 by rack 38 associated with stripper mechanism 32. Rotary wheel indexing means 12 and its associated mechanism is disposed as seen in FIG. 2, between movable platen 34 and fixed platen 82, both of which along with melt extruder 2 and tie bars 50 and 52 are typical of corresponding members in conventional injection molding machines.

The respective stationary mold halves of injection mold 6 and blow mold 22 are mounted on fixed platen 82. Of these, only stationary blow mold half 22a is seen in FIG. 2. Similarly, movable blow mold half 22b is shown mounted on movable platen 34 through "Schnorr" springs 36.

As may be better seen in FIG. 1, "Schnorr" springs 36, in effect compression load limiting spring spacer washers, serve to limit the stress on movable platen 34 disposed just over blow mold 22, thereby to permit concentration of a greater stress over injection mold 6, which requires such greater pressure in order to prevent opening of the mold by the outward pressure of the plastic injected into the mold. Such uneven stress distribution provides stress as needed to maintain both the injection and blow mold in the closed position during injection and blowing and the accomplishment of this function in an injection machine having a single movable platen, as is conventional in such machines, solves a particular problem long known in the art which has seen numerous attempts to convert convention injection molding machines into injection blow molding machines but which to a large extent has been stymied by the asymmetric loading upon the platens in such equipment.

Also essential to this uneven stress distribution are abutments 154a, 156a and 158a, seen in phantom in FIG. 1, attached to movable platen 34. Abutments 154a, 156a and 158a engage corresponding abutments attached to stationary platen 82. Such corresponding abutments 142a and 144a are seen in FIGS. 10 and 2 respectively. Mating abutments 158a and 144a are positioned so that their abutment location is separated from that of abutments 154a and 156a in the plane of movable platen 34 by blow mold 22 and is displaced slightly (on the order of thousanths of an inch) from that of abutments 154a and 156a in the direction perpendicular to and away from stationary platen 82.

As movable platen 34 closes toward stationary platen 82 therefore, abutment 158a first strikes abutment 144a. These abutments 158a and 144a provide a fulcrum as additional clamping force, partially insulated from blow mold 22 by stress limiting washers or "Schnorr" springs 36, causes slight rotational movement of movable platen 34 about this fulcrum, until abutments 154a and 156a engage their mating abutments on stationary platen 82. Thus a disproportionate amount of the total clamping force is brought to bear on injection mold 6.

This means for causing uneven stress distribution or asymmetric loading is in itself a unique and important feature of the present invention.

Figure 3:
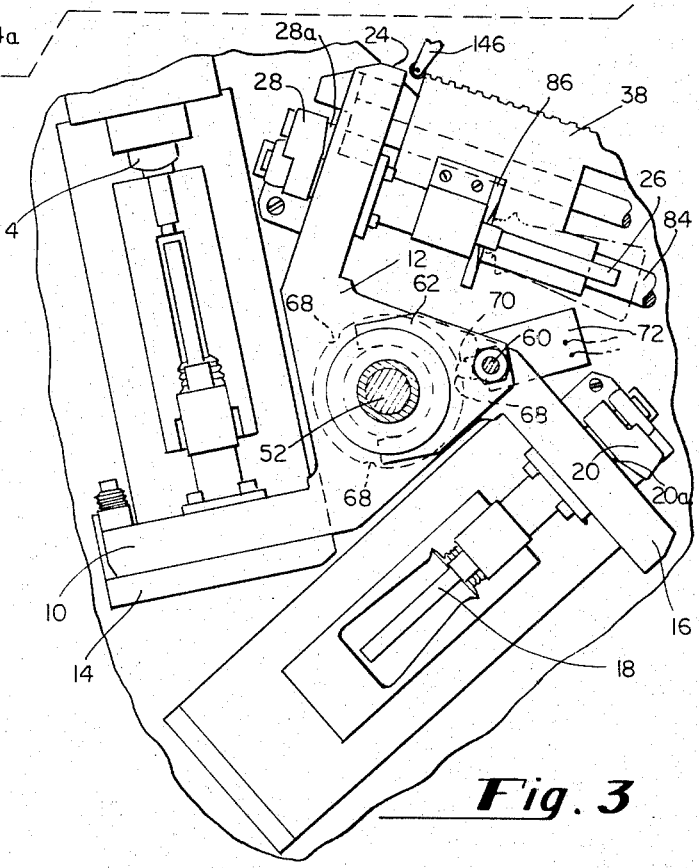
FIG. 3 is a detailed elevation view of the mold set-up and rotary wheel indexing means of the present invention as embodied in the apparatus shown in FIGS. 1 and 2, and as shown by a sectional view in the plane 3—3 of FIG. 4.

In FIG. 3, a detailed view in the plane 3—3 shown in FIG. 2, there is seen rotary wheel indexing means 12 with grooves 68 in the hub thereof and ball member 70 of 360°–180° sensor 72 seated in one such groove. Seen more clearly in FIG. 3 are radial arms 10, 16 and 24 of rotary wheel indexing means 12. Also seen in better detail in FIG. 3 are elements of stripper mechanism 32 including rack 38 stripper piston rod 84 attached both to rack 38 and to yoke stripper member 86. Means are provided for delivering air to the interior or core rods 18 and 26 from air inlet means 20 and 28, respectively, via passageways (not shown) in radial arms 16 and 24 communicating with air passageways and air inlet means 20 and 28 through "O" ring seals 20a and 28a in air inlet means 20 and 28. As is described more clearly hereinafter, air inlet means 20 and 28 are brought into engagement with radial arms 16 and 24, respectively, by the seating movement of rotary wheel indexing means 12 toward fixed platen 82.

Figure 4:
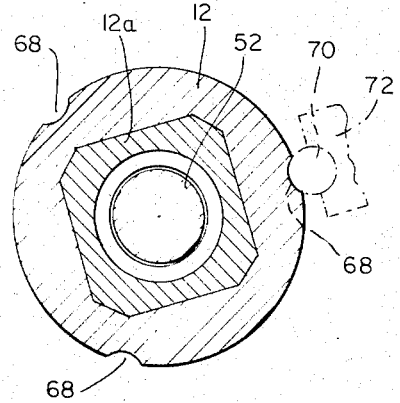
FIG. 4 is a sectional view in the plane 4—4 of FIG. 2 showing the detailed mounting mechanism of the rotary wheel indexing means of the present invention and a particular unique sensing switch used therein.

A further detail of that part of the apparatus shown in FIG. 3 is seen in the sectional view of FIG. 4 wherein the hub of rotary wheel indexing means 12, including grooves 68, is seen to be mounted on a shaft therefor 12a (attached as seen in FIG. 2 to sprocket wheel 74) with polygonal mating surfaces to ensure the maintenance of proper indexing position relative to the position of stripper rack 8.

Figure 5:
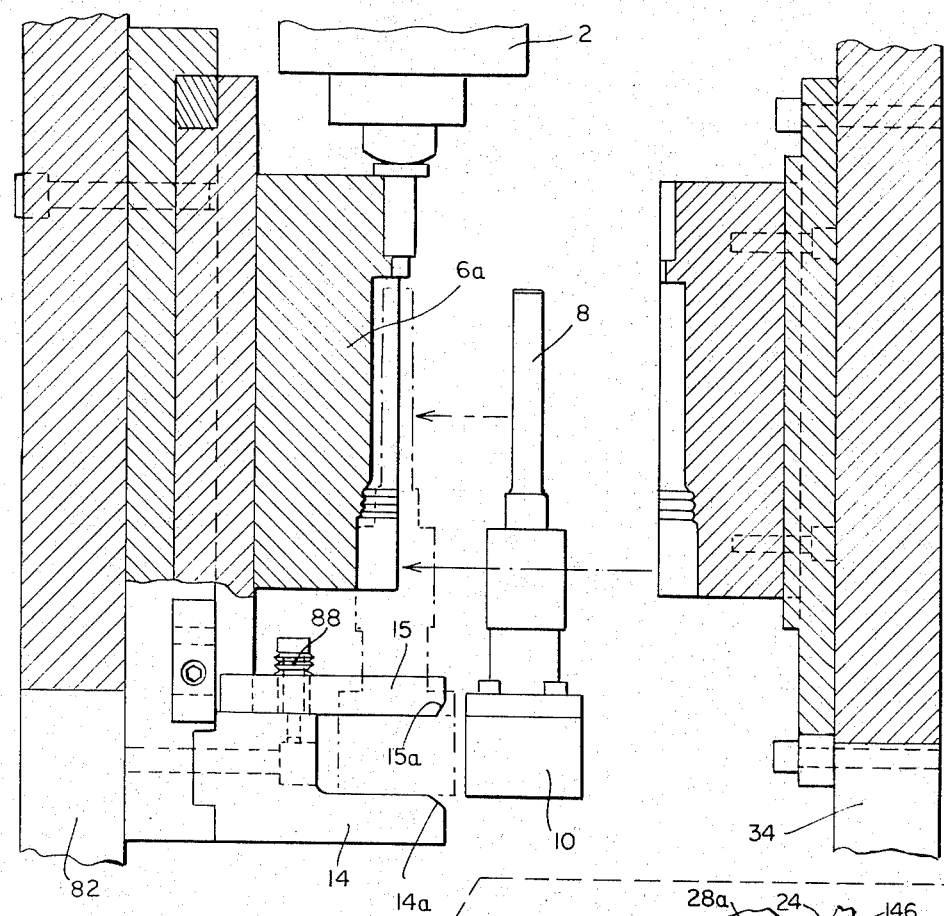
FIG. 5 is a sectional enlarged view of the injection blow mold area of the machine shown in the preceding FIGURES.

Turning now to FIG. 5 there is shown in detail the seating arrangement of radial arm 10 and core rod 8 in stationary injection mold half 6a mounted on fixed platen 82. As shown specifically in FIG. 5, injection pressure backup member 14 is mounted on fixed platen 82 along with a second guide member 15, both provided with sloped entry edges 14a and 15a, respectively, to ensure proper radial positioning of radial arm 10 and rotary wheel indexing means 12 to which it is attached, as rotary wheel indexing means 12 and the radial arm and the core rod mounted thereof are seated against the various mating and abutting mechanisms attached to fixed platen 82. As will be described more fully hereinafter, a declutching means is provided to ensure the free radial movement of rotary wheel indexing means in the last part of the movement thereof towards fixed platen 82 in order to permit guide members 14 and 15 to position precisely rotary wheel indexing means 12.

It will be noted that guide member 15 is secured to guide member 14 through "Schnorr" springs 88 to minimize wear on the radial arms of rotary wheel indexing means 12 and on guide members 14 and 15. The injection pressure backup member 14 and the guiding means 14 and 15, together with an indexing means adapted to mate with such backing members and guiding members are themselves considered unique and important features of the present invention.

In FIG. 6, a detailed sectional view in the plane 6—6 shown in FIG. 1, there is seen core rod 18 mounted on radial arm 16 disposed between stationary blow mold half 22a and movable blow mold half 22b. Through continuous passageway 90 in core rod 18 and radial arm 16 is extended core rod valve connecting member 92 connecting core rod valve 94 and core rod valve actuator 96 spring loaded in the closed position by coil spring 98. Similar passageways and valves are also included in corresponding radial arms and core rod 10 and 8 and 24 and 26. Seating of core rod 18 and radial arm 16 in stationary blow mold half 22a causes engagement of radial arm 16 with projecting member 100 of air inlet means 20 and angular movement thereof about pivot 102 in opposition to the biasing spring 104 urging air inlet means 20 in the opposite direction. As better seen in FIG. 9, this angular movement of air inlet means 20 moves air valve engaging member 106, including valve actuating member 108 and air passageway 110, into engagement with radial arm 16 thereby opening valve 94 and putting air passageway 90 in communication with air passageway 110, through "O" ring seal 20a, and engaging head 106. Passageway 110 is in turn connected through an air inlet line 112 to a source of compressed gas, usually air.

Air inlet means 28 acts correspondingly with respect to core rod 26 and radial arm 24 to provide temperature conditioning air for core rod 26 after a bottle has been stripped therefrom. Obviously, air inlet means 28 is optional in that no such air inlet means is required if gas temperature conditioning of the core rods is not required in a particular operation.

Air inlet means such as those shown in illustrated apparatus for the admission of blow air and conditioning air, particularly including the engagement mechanism and design features thereof are also considered an important and novel feature of the present invention.

Another detail of the apparatus may be seen by reference to FIGS. 6 and 8. Reference is made in particular to the means of attachment of movable blow mold half 22b to movable platen 34 through mold mounting member 114 in turn attached to movable platen 34 through bolt retainers 116 and thrust transmitters 118 to force transmitting plate 120. This is in turn attached to movable platen 34 through bolts 122, the heads of which are separated from force transmitting plate 120 by spring loaded spacer washers or "Schnorr" springs 36. Upon closure of movable platen 34 the closure pressure resistance force in the area of blow mold 22 is limited by "Schnorr" springs 36 and the abutment locations of abutments 154a, 156a, and 158a, as described above, thereby causing a greater proportion of the press clamping or closure force to be distributed to the area of the injection mold 6. This effects an asymmetric distribution of the clamping force, causing a proportionally greater part of that clamping force to be exerted on the injection mold through the fulcrum effect described more fully above. This is desirable since a greater force is necessary to prevent mold separation in the injection mold which experiences much greater internal pressure than the blow mold during their simultaneous molding operations. That these molds are thus clamped shut within the framework of a conventional two tie bar type injection mold press with efficient stress distribution thereon is considered to be a significant and novel feature of the present invention.

Turning now to another particularly advantageous feature of the present invention, reference is made to FIGS. 6 and 7, where there is shown a mold positioning retainer comprising positioning bolts 124 threaded into mold retainers 126 each having sloped track indentations 128, the sloped track indentations opposing one another and mating with a longitudinal member 128 associated with the mounting means for stationary mold half 22a. Retainers 126 are slidably mounted to permit movement thereof in a direction parallel to the axis of positioning bolts 124. Positioning bolts 124 are retained so that no axial movement thereof is permitted. Therefore, turning either of positioning bolts 124 in one direction and the other bolt in the opposite direction causes longitudinal member 130 to be forced by sloped indentation track 128 in a direction perpendicular to the axis of position bolts 124. In this manner, very precise positioning of the mold half is accomplished. Such simple and precise positioning of a mold on a mold positioning member may similarly be accomplished with all the other mold halves in this apparatus or in fact with the molds or mold halves in any apparatus. As mentioned above, this is a highly advantageous and unique feature of the present invention.

In FIGS. 11 and 12 still other features of the present invention, as embodied in the apparatus illustrated in FIGS. 1–10 are shown. Particularly, the carriage for movable platen 34 is seen to consist of support members 46 on which ride sprocket chain rollers 48 encompassing elongated bearing members 132. Supporting the weight of movable platen 34, together with the associated apparatus mounted thereon facilitates the reciprocating press opening and press closing movement of movable platen 34 on tie bars 50 and 52. The use of an elongated bearing member and associated rolling means is intended to distribute the weight of movable platen 34 and its associated apparatus along a length of support members 46.

The mechanism for moving rotary wheel indexing means away from fixed platen 82 simultaneously with the parallel movement of movable platen 34 but half the distance thereof to permit indexing of rotary wheel indexing means 12 clear of both the movable and stationary mold halves comprises fixed rack 59 attached to stationary platen 82 and engaging gear 56 attached to shaft 54 rotatably mounted in a holding member 134 attached to movable platen 34. Shaft 54 is in turn attached, on its opposite end (the opposite side being shown in FIG. 11) to gear 58, half the diameter of gear 56, gear 58 in turn engaging movable rack 60 connected at the inner end thereof to yoke 62 engaging the hub of rotary wheel indexing means 12. The movable platen and rotary wheel indexing means movement means, thus coordinated and controlled is also considered a novel and important feature of the present invention.

Control and sequencing the apparatus of the present invention, particularly as illustrated in FIGS. 1–12 hereof, requires numerous hydraulic, pneumatic and electrical circuit components. Critical to proper operation of the machine and timely stopping of the machine in the case of malfunction are a variety of switches and sensing mechanisms. One such sensing mechanism is the 360°–180° sensor 72 (LS6), described above, throughout its exposed hemisphere (thus the "360°-180°" designation) causes ball sensing member 70 to be pushed inward thereby producing a sensing signal. In the case of the present invention, sensor 72 is used so that any attempted closure of movable platen 34 and rotary wheel indexing means 12 associated therewith when rotary wheel indexing means is not in one of the three positions governed by grooves 68 therein will actuate sensor 72 (also sometimes referred to herein as limit switch LS6) and stop the machine by opening the electrical circuit to the main hydraulic supply system. comprising a ball sensing member 70 spring loaded in the out position. Engagement of ball sensing member 70 from any direction A second important sensor in the present invention is the knee action cam roller 134 (seen in FIG. 10) which actuates limit switch LS3 upon upward movement of the upper section of pivoted connecting members 135 and 136 to cause declutching of clutch 78, upn the closure movement of movable platen 34, thereby to permit, while the molds are closed, stripping action of stripper yoke 86 without transmission of rotational movement to gear 44 which in turn is connected to rotary wheel indexing means 12. Immediately upon reverse movement of movable platen 34, clutch 78 is engaged and remains engaged throughout the opening movement of movable platen 34 due to the pivotal connection of connecting members 135 and 136. Stripper yoke 86 returning to its starting position then causes indexing of means 12.

Cams 138 mounted on fixed rack 59 provide the necessary camming action for cam roller 134 to control limit switch LS3.

Conventional limit switches 142 and 144 (seen in FIGS. 10 and 2 and sometimes referred to herein as LS2 and LS4, respectively) are also used in the apparatus to signal press closure. Limit switches 142 and 144 are associated with abutment pairs 142a-154a and 158a-144a, respectively, which abutments are further associated with striking members 154 and 158. Striking members 154 and 158 engage and actuate limit switches 142 and 144, respectively, upon press closure.

Limit switch 142 (LS2) acts as a back-up control, backing up cam operated LS3 to ensure declutching of clutch 78 upon press closure. Limit switch 144 (LS4) signals press closure and functions to initiate the blow air sequence and injection sequence of the apparatus, both usually consisting of delay timers and function timers controlling the length of time blow air is admitted to the parison through the core rod at the blow air station and the length of time during which plastic melt is injected into the injection mold at the injection mold station.

An hydraulic valve 152 (seen in FIG. 2 and referred to in the process schematic of FIG. 13 by the notation "HV") is activated by a camming movement from cut-out shaft 137 to which is attached shaft collar abutments 139 engaged by a facing member 140, attached to movable platen 34, near the limits of the reciprocal movement thereof. Shaft 137 is supported by sleeve mounting 136 which is attached to the fixed platen 82. Hydraulic valve 152 controls the flow of hydraulic fluid to the actuating cyclinder of stripper mechanism 32 so that upon the camming action of shaft 137 by the closure movement of movable platen 34 the stripping movement of stripper mechanism 32 is effected. When movable platen 34 moves to the open position, shaft 137 again functions hydraulic valve 152, this time causing stripper mechanism 32 to return to its starting position (and indexing of indexing means 12).

As described above, 360°-180° sensor 72 (LS6) functions whenever a jam up or some other machine malfunction causes the rotary wheel indexing means 12 to be out of angular position from one of its three permitted angular positions when the press attempts to close. Rather than permitting the press to attempt to close on core rods and mold apparatus, thereby producing damage and maintenance problems, LS6 cuts off the main hydraulic supply to the machine thereby halting all further operation on the apparatus.

As described above, the camming movement of shaft 137 functions to initiate stripping action and stripper return action of stripper yoke 86. Associated with stripper yoke 86 is a double acting limit switch 146 (seen in FIG. 1 and also referred to herein as LS1-1 and LS1-2) the function of which is to set a product sensing switch LS5 (not illustrated in FIGS. 1-12) in the product discharge chute (also not shown) and to initiate charging of a recycle capacitor which, upon proper functioning of the product discharge sensing switch LS5 and the return of stripper yoke 86, signaled by LS1, to its starting position is discharged thus initiating the next subsequent machine cycle.

Figure 13:
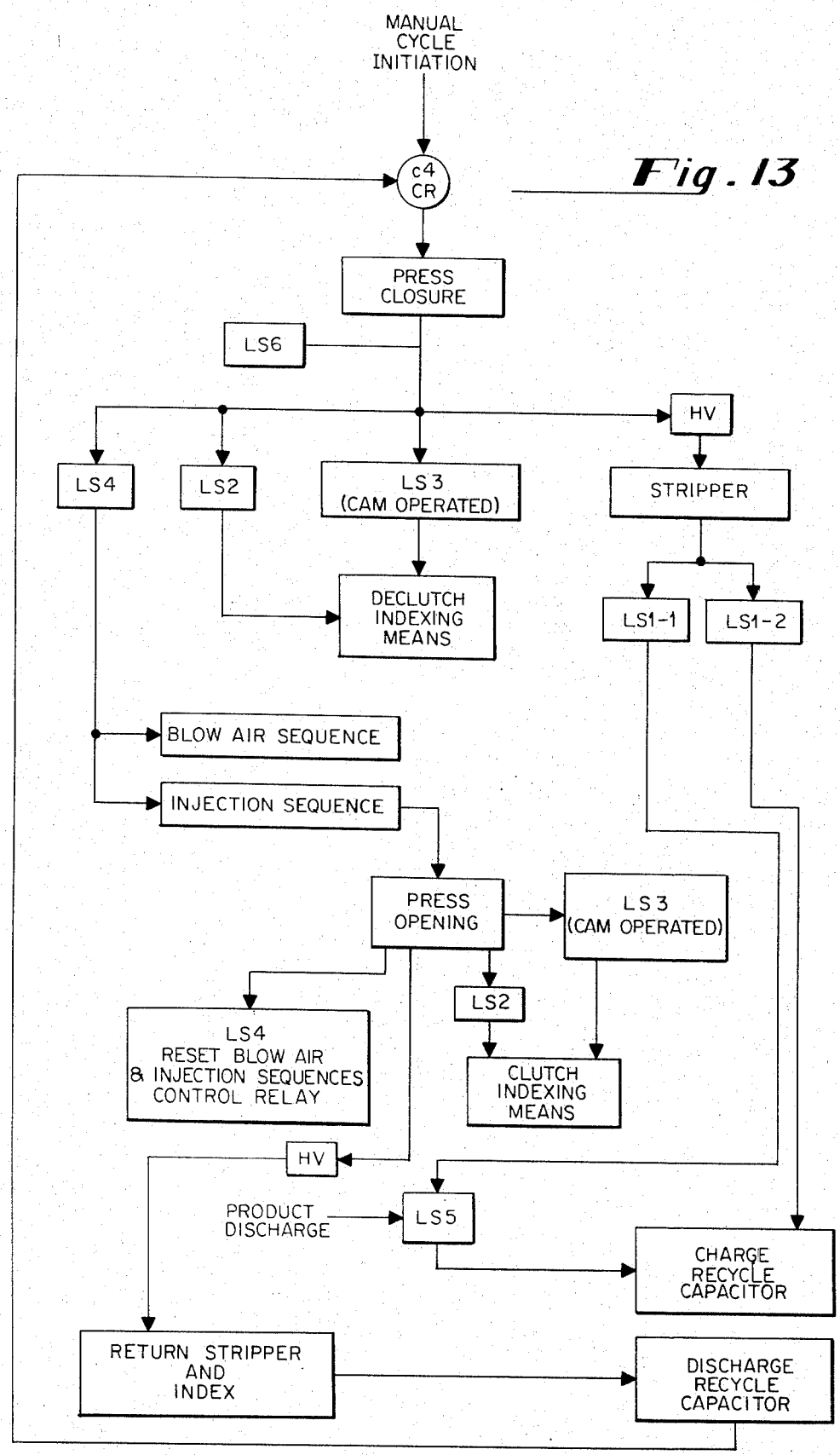
FIG. 13 is a process schematic of the machine shown in FIG. 1, in which the function of the various limit switches and sequencing means are all illustrated schematically.
Figure 14:
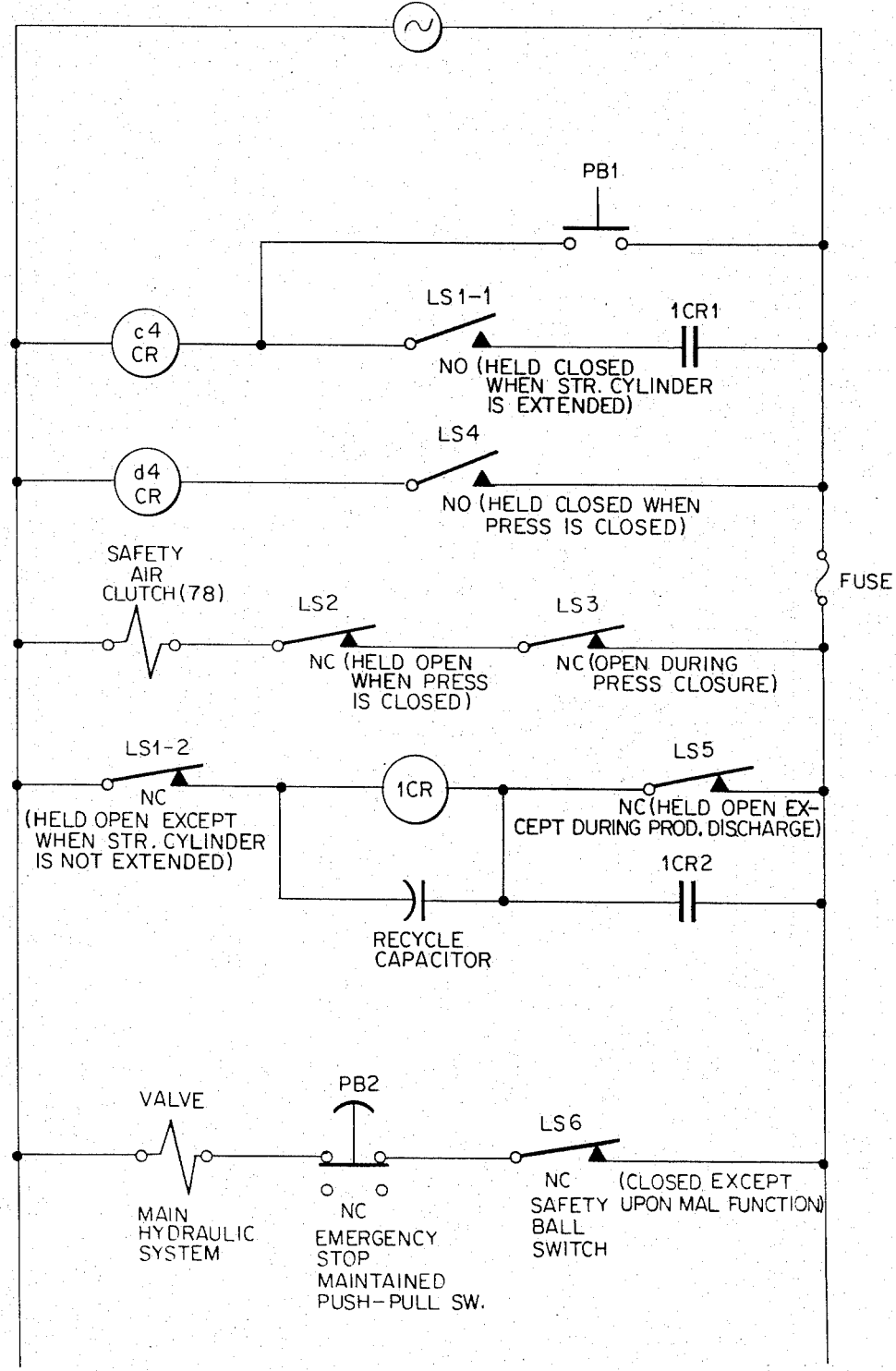
FIG. 14 is a simplified electrical schematic of the preferred apparatus of the present invention, as illustrated in the preceding FIGURES.

The function of these various sensors and sequencing means may best be understood by reference to the overall process schematic diagram of the apparatus illustrated in FIGS. 1-11, as shown in FIG. 12, and the simplified electrical schematic shown in FIG. 13. With reference to both of these FIGURES, the cycle of the machine, once the machine has been brought up to temperature and the melt is ready to be injected, is manually initiated by a push button PB1, normally spring loaded in the open position, which, through control relays c4CR and d4CR effects press closure by signaling of appropriate hydraulic cylinders. Press closure, assuming LS6 is not activated by misalignment of rotary wheel indexing means 12, actuates HV and LS2, LS4 and cam operated LS3. LS4 initiates both the blow air and injection sequences, which ordinarily consist of blow air and injection delay timers and blow and injection function timers (not illustrated). LS2 and LS3 both function to activate clutch 78 and to declutch the rotary wheel indexing means, thereby to permit final angular positioning thereof by the guides 14a, 14, 15a, 15 provided for that purpose upon press closure. Cam operated HV actuates stripper mechanism 32 to remove any bottle on the core rod at the stripper station. As stripper yoke 86 leaves its rest position to strip the bottle from the core rod at that position, it also actuates LS1-1 and LS1-2. LS1-1 sets LS5 to sense product discharge while LS1-2 in combination with control relay 1CR, activated by product discharge activation of LS5, in turn closes contacts 1CR1 and 1CR2 causes charging of the recycle capacitor and preparing for the discharge of that capacitor, initiated also by LS1, upon the return of stripper yoke 86 to its rest position. This function causes discharge of the recycle capacitor reactivating control relay c4CR initiating the next machine cycle. Meanwhile, termination of the injection sequence through appropriate control relays and hydraulic mechanism causes the press to open in turn resetting LS4 and, through LS3 and LS2, causing engagement of clutch 78 to prepare for indexing of rotary wheel indexing means 12 upon the return of stripper yoke 86 to its rest position which is in turn initiated by cam operated hydraulic valve 152 (HV). As shown in FIG. 13, also contained in the system is a push-pull emergency button, PB2, which deactivates the main hydraulic supply system thereby stopping all machine functions at any point, in case of an emergency, upon manual actuation of PB2.

In operation, the machine illustrated in FIGS. 1–14, embodying the preferred form of the present invention and the preferred form of all the particular subcombinations thereof, functions as follows.

Plastic material is melted and extruded by plastifier 2 through nozzle 4 into parison mold 6 surrounding core rod 8 attached to one radial arm member 10 of rotary wheel indexing means 12.

At the same time, compressed air introduced through air inlet means 20 passes through a passageway 90 provided for that purpose in radial arm 16 and core rod 18, the core rod valve 94 of which is activated by projecting member 108 in air inlet means 20 activating valve actuator 96, thus causing expansion of a parison, injection molded about the core rod 18 in a previous machine cycle, into a bottle formed by blow mold 22. Also at the same time a blown bottle on core rod 26 mounted on third radial arm member 24 is stripped therefrom by the activation of stripper means 32, and particularly yoke member 86 attached thereto. During this stripping action, shaft 40 is declutched by clutch 78 so that the turning of gear 44 by rack 38 in conjunction with the stripping action does not turn sprocket wheel 76. The blown bottle, formed in the preceding cycle of the machine, thus removed, is discharged into a chute, not shown, actuating limit switch LS5, not shown, indicating such discharge. In the event limit switch LS5 is not activated, further cycling of the machine is interrupted thus preventing attempted mold closure on an imperfect or "hung-up" bottle, parison, bent core rod, etc.

Following stripping, compressed gas or air may be passed through the core rod located at the stripping station, from inlet means 28, to effect temperature conditioning thereof (either heating or cooling) in preparation for the next injection cycle.

Both the blow air and parison injection sequences may and usually do involve delay timers and function timers permitting optimum bottle and parison formation conditions, respectively. At the conclusion of either or both of these sequences, typically the injection sequence in the function of the apparatus illustrated as shown in the process schematic of FIG. 13, the press is opened, such as by the outward movement of movable platen 34, thereby opening both the injection and blow molds 6 and 22, respectively.

At the same time, gear 56 is turned by rack 59 in turn turning gear 58 mounted on common shaft 54 with gear 56, thus causing a reverse movement of rack 60 which is attached to yoke member 62 associated with rotary wheel indexing means 12, and thereby effecting an outward movement of rotary wheel indexing means 12 approximately half the distance of the outward movement of movable platen 34. In the course of the movement of movable platen 34, the weight thereof and the apparatus associated therewith is supported by sprocket roller members 46, 48 and 132. Press opening as signaled by LS3, actuates clutch 78 and, through hydraulic valve 152 (HV), causes return of stripper mechanism 32 to its initial or seated position. The return of yoke member 86, along with rack 38, of stripper mechanism 32 to this position causes rotational movement of gear 44 and shaft 40, which through clutch 78 turns sprocket wheels 76 and 74. The latter, attached to shaft 12a mounted on tie bar 52, causes rotation of rotary wheel indexing means 12 about tie bar 52.

At the conclusion of this stripper return and indexing movement, limit switch LS1, associated with stripper mechanism 32 signals the start of another cycle of the machine beginning with press closure or more specifically inward or seating movement of movable platen 34 and corresponding inward movement of rotary wheel indexing means 12. In the course of press closure, limit switch LS3, more specifically cam roller 134 causes declutching of clutch 78 and, at the conclusion of press closure, hydraulic valve 152 (HV) causes actuation of the stripping operation of stripper mechanism 32.

Press closure and coincident seating of rotary wheel indexing means 12 causes the radial arm of means 12 located in the blow mold station to engage projecting member 100 of gas or air inlet means 20 causing seating of means 20 through seal 20a against that radial arm and also causing actuation of valve 94 by member 108. Corresponding function occurs at the stripper station where air or gas inlet means 28 engages the radial arm located at the stripper station.

Assuming that press closure is not interrupted by LS6 indicating that rotary wheel indexing means 12 is out of position, the machine is then ready to injection mold a new parison on the core rod located at the stripper station in the previous cycle of the machine, to blow a new bottle from the parison injection molded in the previous cycle of the machine and to strip a bottle from the core rod blown in the blow mold during the previous cycle of the machine.

To ensure proper and precise angular positioning of rotary wheel indexing means 12 as it moves into its mold close or seated position, radial arm 10 located at the parison mold or injection mold station is guided by double wedge guide means 14a and 15a guide members 14 and 15. Guide means 14 further serves as a pressure resisting member to resist the injection pressure as plastic is molded under high pressure around core rod 8.

It should be noted that while this invention has been described with respect to the preferred embodiments thereof it should not be considered limited thereto since numerous minor modifications and variations will be apparent to those skilled in the art. The appended claims therefore are intended to cover all such obvious modifications and variations of the invention as will be evident to those skilled in the art, which are within the true spirit and scope of the present invention.

We claim:

1. In an injection blow molding machine wherein plastic is injection molded into a parison covering a core rod at a first station, blown into a bottle by compressed gas admitted to the interior of said parison through said core rod at a second station, and ejected, in blown bottle form, from said core rod at a third station, said stations being radially disposed in a common plane about a central axis, the improvement consisting of a means for holding said core rods and for transferring said core rods from each station to the next successive station, said means consisting of a rotor, adapted to rotate about said axis with arms projecting radially therefrom, each of said arms including means for mounting core rods thereon in a position projecting perpendicularly from said arms in said plane.

2. In an improved injection blow molding machine, as recited in claim 1, the further improvement wherein said arms are substantially tangent to said rotor.

3. In an improved injection blow molding machine, as recited in claim 1, the further improvement consisting of a rigidly mounted member positioned to contact a radial arm of said rotor disposed adjacent said first station, on the side of said radial arm opposite said core rod in said plane.

4. In an improved injection blow molding machine, as recited in claim 1, the further improvement consisting of
 a. an injection mold, consisting of a stationary mold half and a movable mold half, positioned at said first station and adapted to enclose a core rod positioned at said first station, when said movable mold half and said rotor with core rod positioned thereon are in a mold closed position,
 b. a blow mold, consisting of a stationary mold half and a movable mold half, positioned at said second station and adapted to enclose a core rod positioned at said second station, when said movable mold half and said rotor with core rod positioned thereon are in a mold closed position,
 c. mold opening means for moving said movable mold halves and said rotor, together with the core rods mounted thereon, from the mold closed position in a direction parallel to said axis and away from said stationary mold halves, the distance of movement of said rotor being less than that of said movable mold halves,
 d. disengagable indexing means for rotating said rotor an angular distance approximately corresponding to the common angle separating each of said work stations from work stations adjacent thereto, and each of said radially projecting arms from arms adjacent thereto,
 e. disengagement means for disengaging said indexing means and permitting limited free rotational movement thereof at the end of the rotational movement imparted by said disengageable indexing means,
 f. mold closing means for moving said movable mold halves and said rotor in a direction opposite that of said mold opening means and back to said mold closed position,
 g. guide means for precisely angularly positioning said rotor with respect to said molds as said mold closing means moves said rotor toward said mold closed position.

5. An improved injection blow molding machine, as recited in claim 4, wherein said guide means comprises a pair of spaced wedge members adapted to receive one arm of said rotor as said rotor moves axially toward the mold closed position and to position said rotor angularly as said rotor approaches said mold closed position, one of said wedge members contacting said radial arm of the side of said arm opposite that from which said core rod projects, said wedge member acting as a bearing surface to receive force applied to said arm on the side thereof from which said core rod projects.

6. An improved injection blow molding machine, as recited in claim 5, wherein said pair of wedge members are attached to a rigid mounting surface by means permitting slight movement of said wedge means away from one another while urging said wedge members toward one another.

7. An improved injection blow molding machine, as recited in claim 6, wherein said core rods consist of a tubular sleeve open at one end to an annular mounting head extending through and attached to said radial arm, the other end of said sleeve including a slide valve for admitting gas from the interior of said core rod into a parison molded around said core rod, said valve being biased in a closed position and including an actuator member extending back to said mounting head adapted to open said valve upon application of a compressive force to said actuator, said machine including gas inlet means, disposed at at least one of said stations, for actuating said valve and admitting pressurized fluid into said core rod, said means consisting of a member having a passageway connected to a source of compressed gas and otherwise terminating in an opening with a member projecting from the center thereof, said opening and said projecting member adapted by pivotal movement of said gas inlet means, to engage and to disengage said annular mounting head and said core rod valve, respectively, said gas inlet means being urged away from such engagement and being forced, by contact with said rotor as it moves toward its mold closed position, into such engagement.

8. An improved injection blow molding machine, as recited in claim 7, further including seating means in the area of engagement of said core rod and said opening in said pressurized fluid inlet means to prevent loss of gas therefrom during said engagement.

9. An improved injection blow molding machine, as recited in claim 6, further including valve means for interrupting the flow of pressurized fluid through said gas inlet means and for actuating said valve to permit said flow upon engagement of said means and said core rod.

10. An improved injection blow molding machine, as recited in claim 1, wherein movable mold halves of said injection and said blow molds are mounted on a common movable platen, said blow mold half being attached thereto by stress relief means limiting the compressive force applied by said platen on said blow mold, said force limiting means being adapted to produce a disproportionately greater compressive force on said injection mold than on said blow mold.

11. An improved injection blow molding machine, as recited in claim 10, further including abutment means to stop the closure movement of said movable platen in the area of said blow mold just prior to completion of said closure movement in the area of said injection mold.

12. An improved injection blow molding machine, as recited in claim 10, wherein said stress relief means comprises compressive spring means interposed between said movable platen and said blow mold.

13. An improved injection blow molding machine, as recited in claim 1, including (I) control means, which in response to movement of said movable platen and said rotary wheel indexing means into said mold closed position (a) activate a bottle stripper means at said third station, (b) initiate mechanisms to introduce pressurized fluid into said blow mold through said core rod at said second station and to injection mold a parison at said first station, and (c) declutch said stripper movement from said indexing movement, (II) limit switches activated by said stripper means to prepare a machine recycle means, (III) means responsive to completion of parison molding for initiating movement of said movable platen and said rotary wheel indexing means into said mold open position, (IV) means in response to said mold opening movement for (a) clutching said indexing means to said stripper means and (b) returning said stripper mechanism to its starting position, said movement functioning through said clutching means to produce indexing movement of said indexing means, and (V) means activated by the return of said stripper mechanism to its starting position and the discharge of a product from the machine to initiate recycle of the machine.

14. An improved injection blow molding machine, as recited in claim 13, further including mis-indexing sensing means to stop all function of the machine in the event of the attempted mold closure with the rotary wheel indexing means angularly displaced from any proper index position.

15. An improved injection blow molding machine, as recited in claim 14, wherein said mis-indexing sensing means comprises a 360°–180° out of position sensor comprising a protruding ball sensor member urged outwardly and a sensing means activated by any inward movement of said ball member, said member and said means being adapted to produce a signal upon the application of compressive force to said ball member at any point on the outer hemisphere of said ball member, said ball sensor member engaging slots therefor along the periphery of a shaft associated with said rotor parallel to the axis thereof.

* * * * *